US 6,679,339 B1

(12) United States Patent
Steinlage et al.

(10) Patent No.: US 6,679,339 B1
(45) Date of Patent: Jan. 20, 2004

(54) IMPLEMENT LIFT AND LEVEL SYSTEM WITH A FRONT MOUNTED DIRECT COUPLED ROCKSHAFT

(75) Inventors: David Lee Steinlage, Dallas Center, IA (US); Brian Thomas Mosdal, Ankeny, IA (US); James Thomas Noonan, Bondurant, IA (US); Garrett Lee Goins, Ankeny, IA (US); Anthony Scott Royer, Adel, IA (US); David Alan Payne, Urbandale, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/326,672

(22) Filed: Dec. 19, 2002

(51) Int. Cl.[7] .............................................. A01B 63/16
(52) U.S. Cl. ....................... 172/395; 172/776; 172/669; 172/417; 172/452; 172/679
(58) Field of Search ................................ 172/776, 482, 172/669, 668, 452, 238, 392, 417, 395, 401, 677, 407, 396, 397, 679; 111/52, 70, 53

(56) References Cited

U.S. PATENT DOCUMENTS

| | | | | | |
|---|---|---|---|---|---|
| 3,576,213 A | * | 4/1971 | Hall | ............................. | 172/44 |
| 3,730,280 A | * | 5/1973 | Oelschlaeger | ............... | 172/581 |
| 4,108,249 A | * | 8/1978 | Anderson et al. | ............ | 172/328 |
| 4,371,039 A | * | 2/1983 | Schaaf et al. | ............... | 172/244 |
| 4,373,591 A | * | 2/1983 | Schaaf et al. | ............... | 172/328 |
| 4,450,917 A | * | 5/1984 | Hake | ............................. | 172/328 |
| 4,606,413 A | * | 8/1986 | Hake | ............................. | 172/328 |
| 4,712,622 A | * | 12/1987 | Birkenbach et al. | ........ | 172/328 |
| 5,156,216 A | * | 10/1992 | Van Mill | ..................... | 172/138 |
| 5,669,452 A | * | 9/1997 | Wright et al. | ............... | 172/685 |
| 5,992,535 A | * | 11/1999 | Bierl et al. | .................. | 172/328 |
| 6,068,064 A | * | 5/2000 | Bettin et al. | ................ | 172/413 |
| 6,371,216 B1 | * | 4/2002 | Friggstad | .................... | 172/322 |
| 6,401,832 B1 | * | 6/2002 | Payne et al. | ................ | 172/238 |

OTHER PUBLICATIONS

Deere & Company, patent application filed Oct. 25, 2002, ser. No. 10/281,443 entitled "Directly Actuated Depth Control".

* cited by examiner

Primary Examiner—Victor Batson

(57) ABSTRACT

A rockshaft is mounted over the front rank of the implement frame and is operated by cylinders located at opposite ends of the rockshaft connected to lift arms extending radially adjacent bearing mounts. Fore-and-aft extending links aligned with the lift arms and mounts operate lift wheel assemblies. A hitch arm connected near the center of the rockshaft is directly connected to a hitch turnbuckle for level lift operation. An aligned arrangement of cylinders, cylinder brackets, links and arms provides minimal torsional loading, particularly when the rockshaft is rotated to fully raise the implement frame for transport and is in the most susceptible shock loading condition. Moment arms are controlled to minimize rockshaft torsional loading during highest stress conditions. The front-mounted rockshaft provides simplicity and advantageous weight distribution.

16 Claims, 6 Drawing Sheets

IMPLEMENT LIFT AND LEVEL SYSTEM WITH A FRONT MOUNTED DIRECT COUPLED ROCKSHAFT

FIELD OF THE INVENTION

The present invention relates generally to agricultural implement frames and more specifically, to lift and leveling systems for such frames.

BACKGROUND OF THE INVENTION

Agricultural implement frames for pull-type implements such as tillage and seeding equipment or the like typically include a level lift rockshaft system. A rear-mounted rockshaft weldment connected to lift wheel assemblies is mechanically linked through a complex linkage arrangement to a hitch pivotally connected to the front of the frame. A bellcrank is connected through a link to the hitch. As the rockshaft is rotated to change the position of the lift wheels relative to the frame, the implement is raised and lowered and the linkage arrangement pivots the hitch to maintain the frame in generally a level condition.

Most level lift rockshaft systems have a relatively large number of parts and wear points. As a result, such systems are usually heavy and expensive. A large number of wear points make such a system somewhat unreliable. The conventional aft location of the heavy rockshaft structure detrimentally shifts considerable weight to the rear of the implement. Torsional windup of the rockshaft is also a common problem, and the rockshaft must have a substantial wall thickness to withstand the torsional forces and prevent windup, a requirement which adds to the weight and expense of the implement. The rockshaft is subject to extreme shock loading, particularly when the implement is fully raised to a transport position.

SUMMARY OF THE INVENTION

It is therefore an object of the present invention to provide an improved rockshaft system for an implement. It is another object to provide such a system which overcomes most or all of the aforementioned problems.

It is a further object of the invention to provide an improved rockshaft system for an implement which is less expensive to manufacture, more reliable in operation and more advantageous in weight distribution than at least most previously available rockshaft systems. It is another object to provide such a system which has reduced rockshaft windup, less complex mounting and linkage structure and fewer wear points.

It is a further object of the invention to provide a relatively low cost implement frame with an economical level lift rockshaft system, better weight and load distribution, and fewer wear points than at least most previously available implement frames.

A rockshaft is mounted over the front rank of the implement frame and operated by cylinders located at opposite ends. Each cylinder is connected to a lift arm extending radially from an end of the rockshaft which also is directly connected to a fore-and-aft extending link which operates trailing lift wheel modules connected to the frame. A hitch arm connected near the center of the rockshaft is directly connected to a hitch turnbuckle for level lift operation without need for a complicated bell crank structure. The use of the two end cylinders with direct coupling of the lift linkages facilitates use of a parallel/series type of hydraulic circuit with torsional forces resulting from the hitch leveling forces only. Three or more adjustably locatable sets of rockshaft bearing mounts connect the rockshaft to the front tube of the implement frame at locations substantially aligned with hitch and lift arms. The arrangement of cylinders, supports and arms provides minimal torsional loading, and therefore a thinner walled tube can be used to reduce cost and weight. When the rockshaft is rotated to fully raise the implement frame for transport and is in the most susceptible shock loading condition, the torsional loading is minimized, greatly reducing stress and improving the reliability of the frame and lift system. The reduced number of components, improved loading characteristics, and improved weight distribution provide a cost effective, strong and reliable implement frame.

These and other objects, features and advantages of the invention will become apparent from the description below in view of the drawings.

DESCRIPTION OF THE PREFERRED EMBODIMENT

Figure 1:
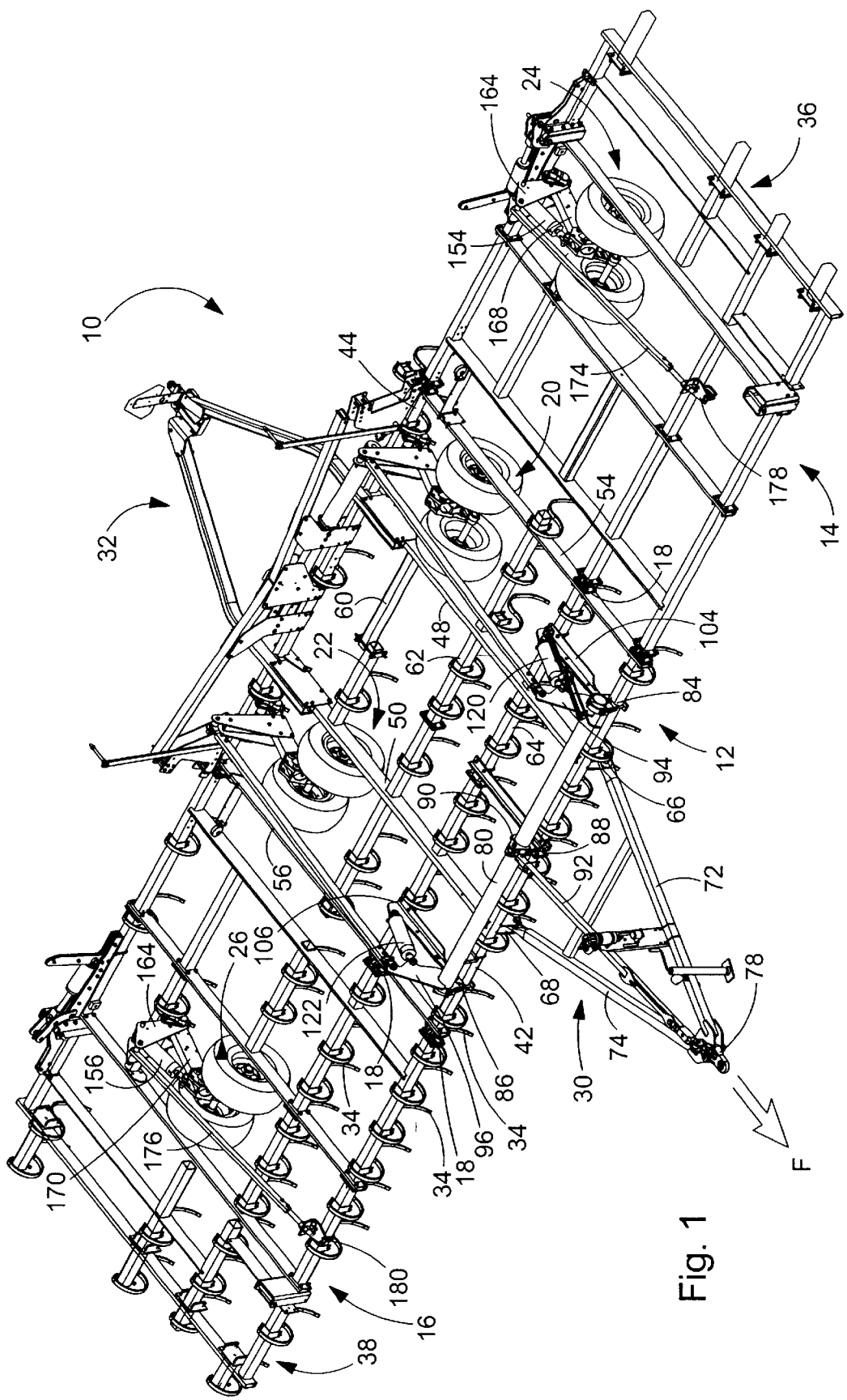
FIG. 1 is a perspective view of a multi-section tillage implement with a lift and level system.

Referring now to FIG. 1, therein is shown a portion of an agricultural tillage implement 10 having a center or main frame 12 and wing frames 14 and 16 pivotally connected to the outer ends of the main frame by pivot structure 18. The main frame 12 is supported by lift wheel modules 20 and 22. The wing frames include wheel modules 24 and 26 which support the wing frames 14 and 16, respectively. A front hitch assembly 30 connects the implement 10 to a towing vehicle (not shown) for forward movement F over the ground. A trailing hitch assembly 32 facilitates connection of a spray trailer or other trailing implement to the rear of the frame 12. Tools 34 are supported from the frames 12, 14 and 16 for working the soil. As shown in FIG. 1, the implement 10 includes outermost wing structures 36 and 38 which are hinged to the wing frames 14 and 16.

The main frame 12 includes a front transversely extending beam or tube 42 and a rear tube 44 connected by fore-and-aft extending inner beams 48 and 50 and outermost beams 54 and 56. Intermediate transversely extending frame members or ranks 60, 62 and 64 are located between the front and rear tubes 42 and 44. Brackets 66 and 68 depend from the front tube 42 and pivotally support the aft end of two forwardly converging hitch beams 72 and 74 the front hitch assembly 30 on opposite sides of the centerline of the implement 10. The forward ends of the beams 72 and 74 are joined to a hitch connector 78.

Figure 2:
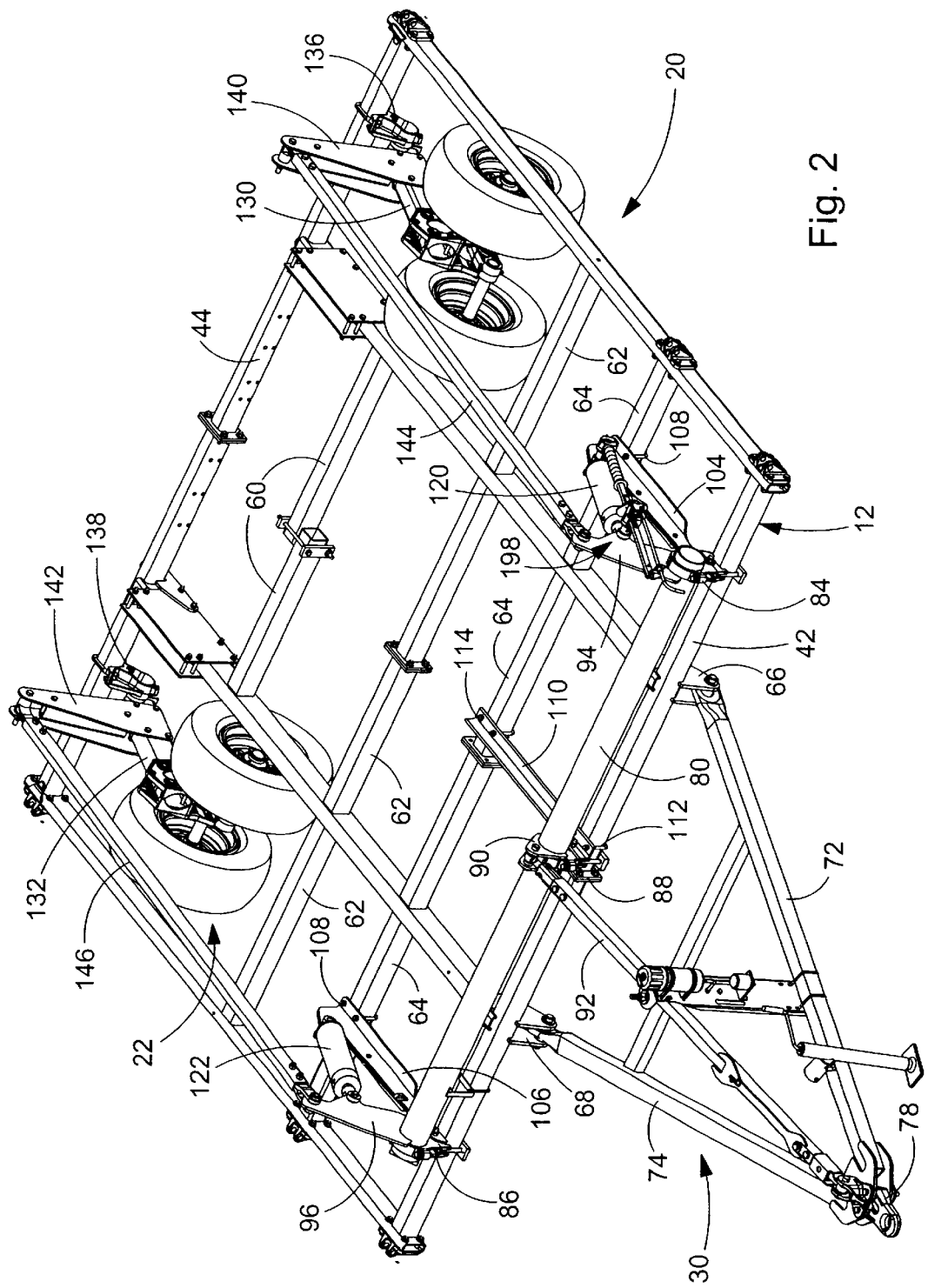
FIG. 2 is an enlarged perspective view of the center frame section of the implement of FIG. 1 with portions removed.

A rockshaft 80 is rotatably supported directly above the forward tube 42 for rotation about an axis parallel to the tube by narrow outer pivot brackets 84 and 86 and a narrow central bracket 88 (FIG. 2). An upwardly extending central arm 90 is fixed to central portion of the rockshaft 80 immediately adjacent the central bracket 88. An adjustable length fore-and-aft extending leveling link 92 has an aft end pivotally connected to the outermost end of the central arm 90. The forward end of the link 92 is pivotally connected to the hitch connector 78 so that as the rockshaft 80 is rotated, the angle of the hitch assembly 30 relative to the main frame 12 will change.

The outer pivot brackets 84 and 86 are located adjacent the opposite ends of the rockshaft 80, and arms or masts 94 and 96 are connected to the rockshaft immediately adjacent the brackets 84 and 86, respectively. Angle brackets 104 and 106 include forward ends connected to the pivot brackets 84 and 86 and aft ends connected to the transverse frame members 64 by U-bolts 108. A central angle bracket 110 includes a forward end secured by U-bolts 112 to the forward tube 42 immediately adjacent the pivot bracket 88 and an aft end connected to the member 64 by U-bolts 114.

Hydraulic cylinders 120 and 122 have base ends connected to the aft ends of the brackets 104 and 106 over the frame members 64. The rod ends are connected to the arms 94 and 96 for rotating the rockshaft 80 as the cylinders are extended and retracted. The lift wheel modules 20 and 22 include downwardly and forwardly directed wheel arms 130 and 132 pivotally connected by transversely adjustable brackets 136 and 138 to selected spaced locations on the rear tube 44. Mast arms 140 and 142 project upwardly above the frame 12 from the lift arms 130 and 132 forwardly adjacent the arm pivot locations. Fore-and-aft extending links 144 and 146 are pivotally connected between the upper ends of the mast arms 140 and 142 and the upper ends of the forward rockshaft masts 94 and 96, respectively. As the cylinders 120 and 122 are extended, the masts rotate forwardly to pivot the wheel arms 130 and 132 downwardly to lift the frame 12. At the same time, the hitch assembly 30 is pivoted downwardly to facilitate leveling of the implement.

As shown in FIG. 1, the wheel modules 24 and 26 on the outer frames 14 and 16 include lift cylinders 154 and 156 connected in a parallel/series circuit 160 (FIG. 6) with the cylinders 120 and 122. The cylinders 154 and 156 are connected between module support bracket structures 164 and 166 adjustably mounted on selected frame tubes and the forward ends of lift arms 168 and 170. Adjustable links 174 and 176 extend forwardly from the bracket structures 164 and 166 to connections 178 and 180 with forward ranks. By varying the lengths of the links, the positions of the wheels on the modules 24 and 26 relative to the frame can be adjusted to provide frame leveling and the like. FIG. 1 illustrates the flexibility of the wheel module system which permits the wheel locations to be selected to accommodate various tool and hardware locations and spacings on different implement frame layouts.

Figure 4:
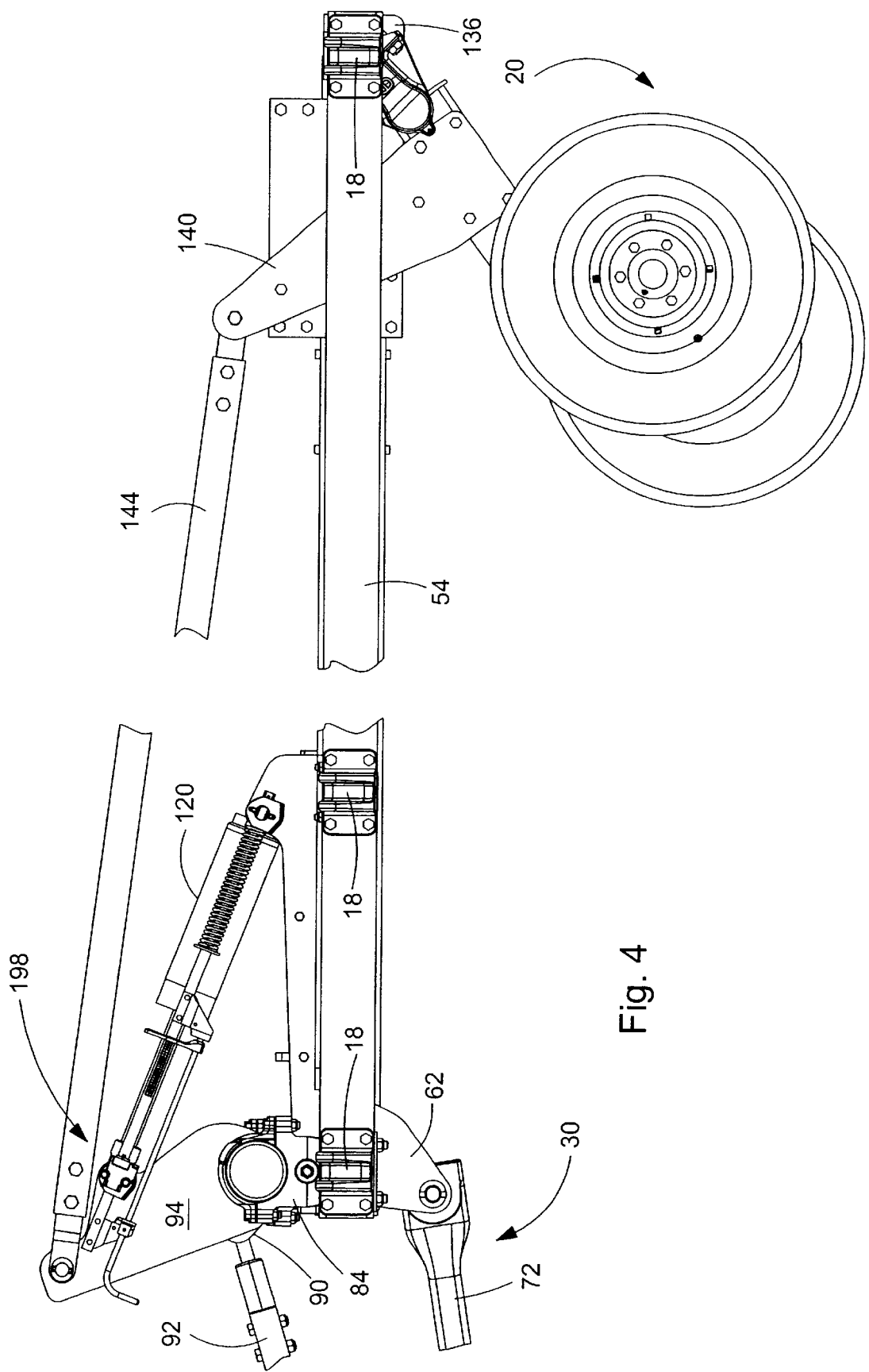
FIG. 4 is a view similar to that of FIG. 3 but showing the implement in a raised transport position.
Figure 6:
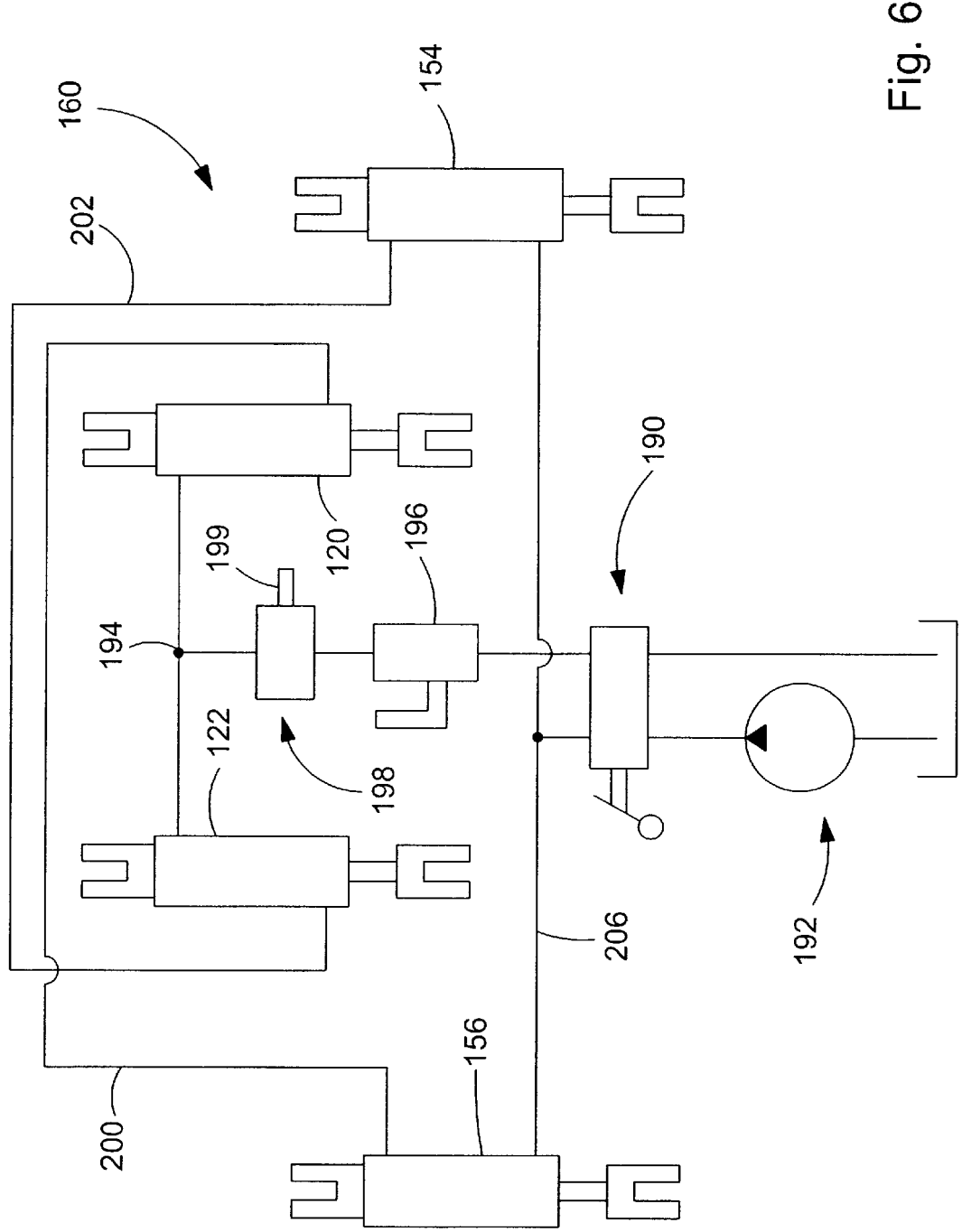
FIG. 6 is a schematic representation of the hydraulic circuit for the lift system of the implement of FIG. 1.

The hydraulic circuit 160 as shown in FIG. 6 includes conventional control valve structure indicated at 190 located on the towing vehicle connected to a source of hydraulic fluid under pressure 192 on the vehicle. A hydraulic line 194 connects the base ends of the main frame lift cylinders 120 and 122 to the valve structure 190 via transport lock valve 196 and a normally open single point depth control (SPDC) valve 198 (FIG. 4) having an actuator 199 for moving the valve to a flow blocking position when the cylinder 120 retracts to a preselected position to provide a depth control stop function. Such a depth control structure, for example, is described in copending and commonly assigned application Ser. No. 10/281,443 filed Oct. 25, 2002 and entitled DIRECTLY ACTUATED DEPTH CONTROL.

The rod end of the cylinder 120 is connected through a line 200 to the base end of the wing lift cylinder 156 so that the cylinder 156 operates in series with the cylinder 120. Similarly, the rod end of the cylinder 122 is connected via line 202 to the base end of the cylinder 154 for series operation of the cylinders 154 and 122. The rod ends of the cylinders 154 and 156 are connected together and to the valve structure 190 through a line 206.

In operation, assuming the cylinders 120, 122 and 154, 156 are fully extended, the wheel modules support the implement frame in a raised transport position. The SPDC valve 198 is in the open position when the frame is raised above the set field-working position. With the transport lock valve 196 (FIG. 6) in the open non-blocking position, the operator moves the valve control structure 190 to open the lines 194 to reservoir so that the cylinders 120 and 122, and the cylinders 156 and 154 connected in series with the cylinders 120 and 122, retract. The cylinders retract substantially in unison until SPDC valve 198 is closed by depression of the actuator 199 to block the line 194 and prevent further lowering of the frame. The valve 198 is adjustable to vary the working depth of the tools 34.

To raise the implement 10 while in the lowered working position, the operator moves valve 190 to pressurize the line 194. A one-way check valve in the valve 198 permits flow to the base end of the cylinders 120 and 122 when the valve 198 is in the blocking position so the cylinders can extend and raise the implement frame. As the cylinders 120 and 122 extend, fluid exiting the rod end of the cylinder 120 causes the wing cylinder 156 to extend in unison with the cylinder 120. Fluid from the rod end of the cylinder 122 extends the cylinder 154 to provide a level lift. For transport, the cylinders 120 and 122 are fully extended, and the valve 196 can be moved to the closed position to lock the cylinders in the extended position.

Figure 5:
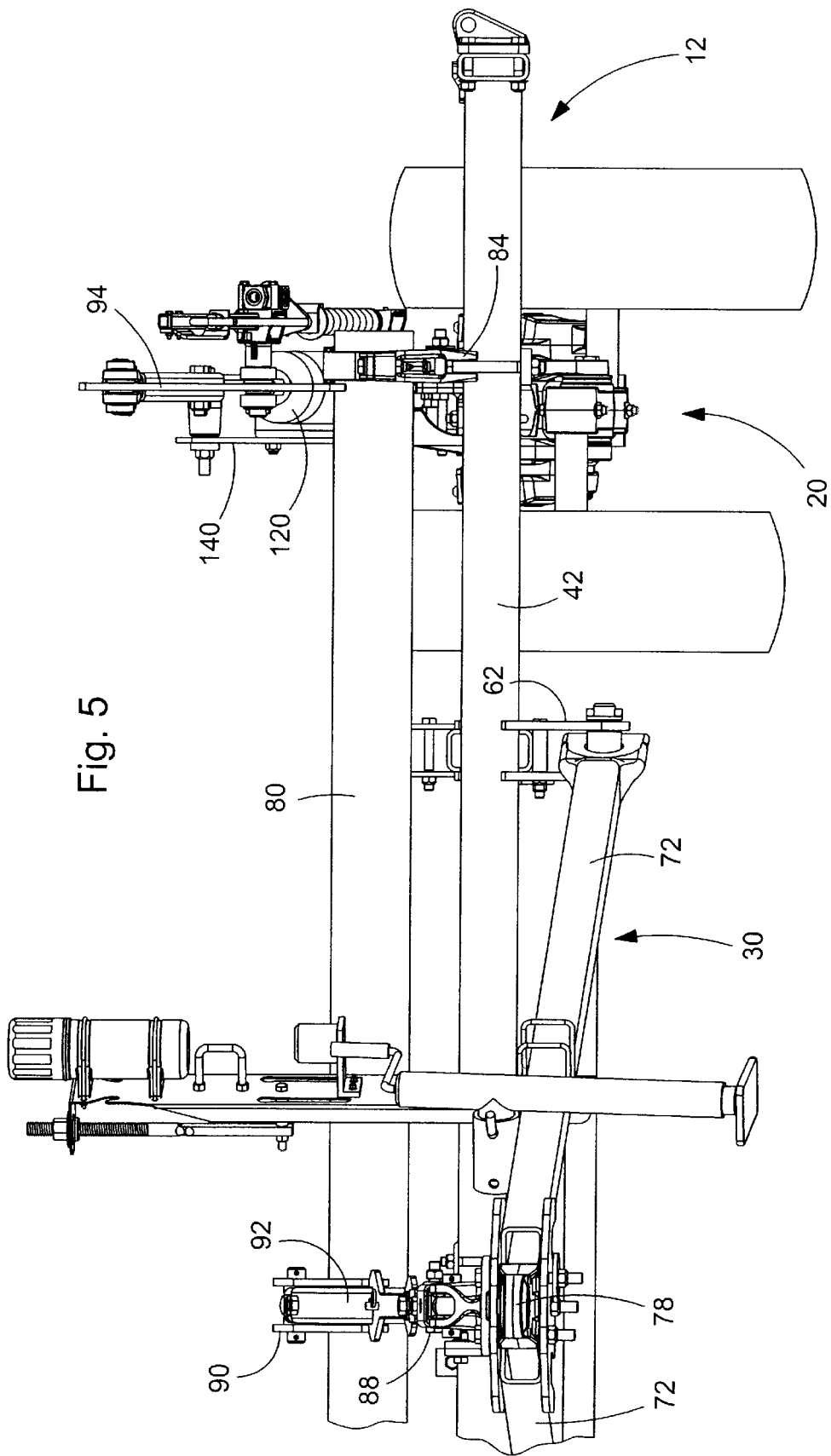
FIG. 5 is a front view of a portion of the implement of FIG. 1.

By operating the cylinders 120 and 122 in parallel at the opposite ends of the rockshaft 80 and generally in line with the corresponding lift linkage structures (see FIGS. 2 and 5) for the wheel modules 20 and 22, torsional forces in the rockshaft are minimized. Therefore, a lighter rockshaft can be used compared to that necessary for a conventional lift arrangement. In addition, the forward mounting of the rockshaft 80 on the frame 12 facilitates direct connection of the hitch leveling link 92 to the rockshaft arm 90. The brackets 84, 104 and 86, 106 are narrow and transversely adjustable on the implement frame to limit interference and provide a wide range of tool, hardware and lift and leveling linkage mounting flexibility. Frame stress from cylinder operation is also reduced through use of the brackets and the alignment of lift linkage components described above.

Figure 3:
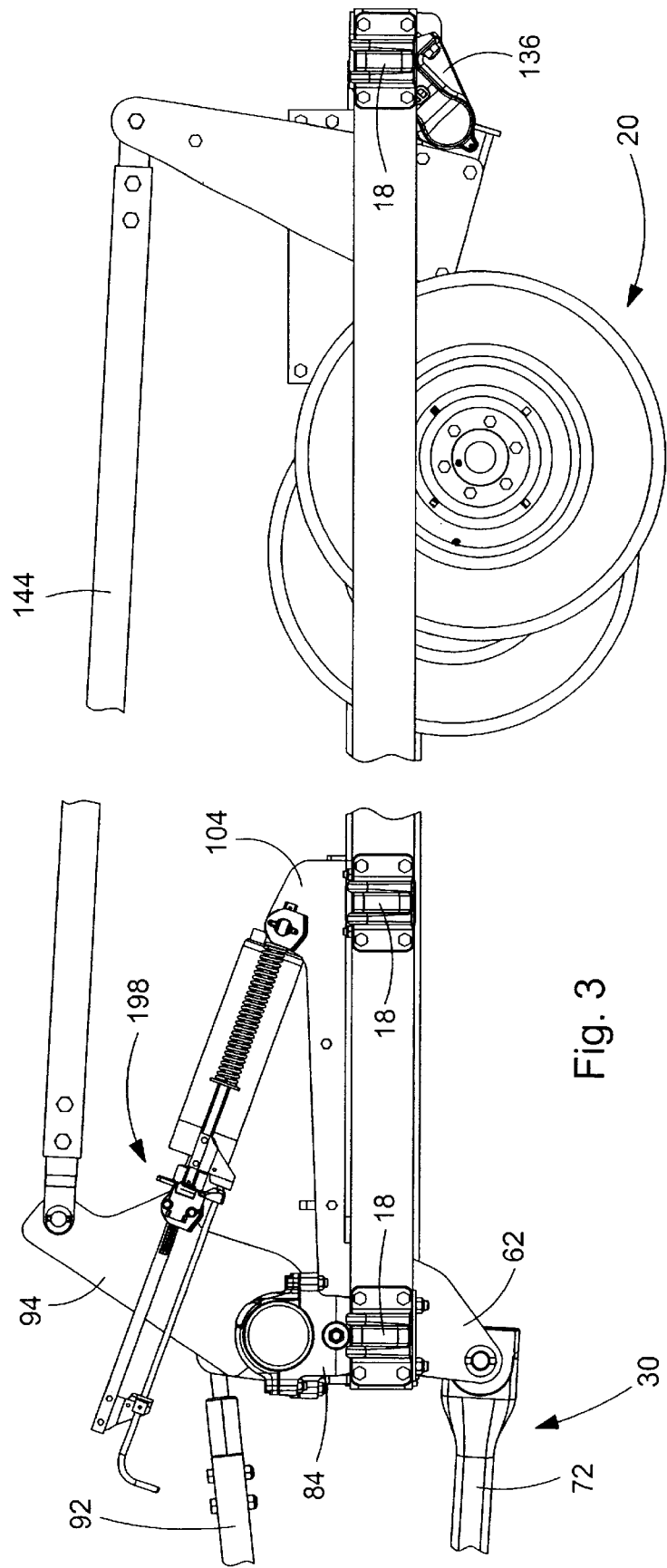
FIG. 3 is a side view of the a portion of the center section of the implement of FIG. 1

In the raised transport position, moment arms through which forces from the from the lift wheel structure and the leveling link act are minimized to reduce torsional loading on the rockshaft. For example, in a maximum stress condition when the wheels of the lift wheel module 20 are lowered (FIG. 4) and the front of the hitch assembly 30 is pivoted downwardly to level the implement for transport, the moment arm through which the forces transferred through the hitch link 92 is very small since the mast 90 is approaching alignment with the axis of the link 92. Therefore, only a small torsional moment is transferred from the hitch structure 30 to the rockshaft 80 in the transport position. The moment arms through which forces in the links 144 and 146 act on the rockshaft 80 are also at a minimum in the transport position. Typically, the masts 94 and 96 are operated either in the fully forward position (FIG. 4) for transport or in the rearward position (FIG. 3) for field-working operations when stresses are largest. Therefore, the time that the rockshaft 80 is in a position wherein the moment arms are substantially upright and define maximum moment arms is minimal and usually occurs midway in the lift or lower cycle when stresses are less.

Having described the preferred embodiment, it will become apparent that various modifications can be made without departing from the scope of the invention as defined in the accompanying claims.

What is claimed is:

1. Agricultural implement lift structure for an implement including a frame having a forward frame member, a hitch connected to the forward frame member and adapted for attachment to a towing vehicle for forward movement through a field, and a rear frame portion located aft of the forward frame member, the lift structure comprising:

a rockshaft having end portions;

bearing structure connecting the end portions to the forward frame member for rotation about an axis transverse to the forward direction;

lift arms extending radially from the end portions adjacent the bearing structure;

lift cylinders connected between the frame and the lift arms for rotating the rockshaft about the axis;

lift wheel structure connected to the rear frame portion behind rearwardly of the bearing structure; and fore-and-aft extending lift links connected at forward ends to the lift arms and at rearward ends to the lift wheel structure for operating the lift wheel structure to raise and lower the frame as the rockshaft is rotated.

2. The lift structure as set forth in claim 1 further comprising level lift structure connected to the hitch including a hitch arm connected to the rockshaft, and a fore-and-aft extending hitch link pivotally connected at an rearward end to the hitch arm and connected at a front end to the hitch for moving the hitch vertically as the lift wheel structure is operated.

3. The lift structure as set forth in claim 2 further comprising central bearing structure supporting the rockshaft immediately adjacent the hitch arm, wherein each cylinder is aligned with a corresponding lift arm and lift link so that torsional forces acting on the rockshaft between the lift arms result primarily from hitch leveling forces on the hitch arm.

4. The lift structure as set forth in claim 1 wherein the frame includes transverse structure located rearwardly of the forward frame member, and bracket structure connected to the forward frame member adjacent the bearing structure and supporting the cylinders, wherein the cylinders, lift arms, bearing structure, and bracket structure are substantially aligned in the fore-and-aft direction to reduce torsional and bending moments in the rockshaft and frame.

5. Agricultural implement lift structure for an implement including a frame having a forward frame member, a fore-and-aft extending hitch pivotally connected at a rearward end to the forward frame member and having a forward end adapted for attachment to a towing vehicle for forward movement through a field, and a rear frame portion located aft of the forward frame member, the lift structure comprising:

a rockshaft having end portions;

bearing structure connecting the end portions to the forward frame member for rotation about an axis transverse to the forward direction;

lift arms extending radially from the end portions adjacent the bearing structure;

a leveling arm connected to the rockshaft between the lift arms;

lift cylinders connected between the frame and the lift arms for rotating the rockshaft about the axis;

lift wheel structure connected to the rear frame portion rearwardly of the bearing structure;

fore-and-aft extending lift links connected at forward ends to the lift arms and at rearward ends to the lift wheel structure for operating the lift wheel structure to raise and lower the frame as the rockshaft is rotated; and a fore-and-aft extending hitch leveling link having a forward link end connected to the hitch and a rear link end pivotally connected to the leveling arm.

6. The lift structure as set forth in claim 5 wherein the implement has a raised transport position, and in the raised transport position, moment arms through which forces from the from the lift wheel structure act are minimized to reduce torsional loading on the rockshaft.

7. The lift structure as set forth in claim 5 wherein the leveling arm defines a moment arm through which forces in the leveling link operate to torsionally load the rockshaft, and wherein the implement has a raised transport position and in the raised transport position the moment arm is minimized to reduce torsional loading on the rockshaft during transport.

8. The lift structure as set forth in claim 5 wherein the lift arms define lift moment arms through which forces in the lift links operate to torsionally load the rockshaft, and wherein the implement has a raised transport position and in the raised transport position the lift moment arms are minimized to reduce torsional loading on the rockshaft during transport.

9. The lift structure as set forth in claim 8 wherein the leveling arm defines a leveling moment arm through which forces in the leveling link operate to torsionally load the rockshaft, and when the implement is in the raised transport position the leveling moment arm is minimized to further reduce torsional loading on the rockshaft during transport.

10. The lift structure as set forth in claim 8 wherein the implement has a lowered working position, and the moment arms are maximized between the raised transport position and lowered transport position.

11. The lift structure as set forth in claim 5 further comprising central bearing structure supporting the rockshaft from the immediately adjacent the leveling arm, wherein each cylinder is aligned with a corresponding lift arm and lift link so that torsional forces acting on the rockshaft between the lift arms result primarily from hitch leveling forces on the hitch arm.

12. The lift structure as set forth in claim 5 wherein the frame includes transverse frame structure located rearwardly of the forward frame member, and bracket structure connected to the forward frame member adjacent the bearing structure and supporting the cylinders, wherein the cylinders, the lift links, the bearing structure, and the bracket structure are substantially aligned in the fore-and-aft direction to reduce torsional and bending moments in the rockshaft and frame.

13. The lift structure as set forth in claim 5 wherein the bearing structure and lift wheel structure include connectors for adjustably mounting the bearing and lift wheel structures at selected locations along the frame to accommodate various spacings of tools and hardware without interference from the bearing and lift wheel structures.

14. The lift structure as set forth in claim 5 further including outer lift wheel structure connected to the frame and having outer cylinders, and a hydraulic circuit connecting the lift cylinders for operation in parallel, and connecting the outer cylinders for operation in series with the lift cylinders.

15. The lift structure as set forth in claim 14 wherein the hydraulic circuit includes a single point depth control valve connected to the lift cylinders.

16. The lift structure as set forth in claim 14 wherein the lift cylinders are connected to opposite ends of the rockshaft.

* * * * *